May 1, 1962 C. A. PARSKE ETAL 3,031,902
INDEX MECHANISM
Original Filed March 10, 1958 5 Sheets-Sheet 1
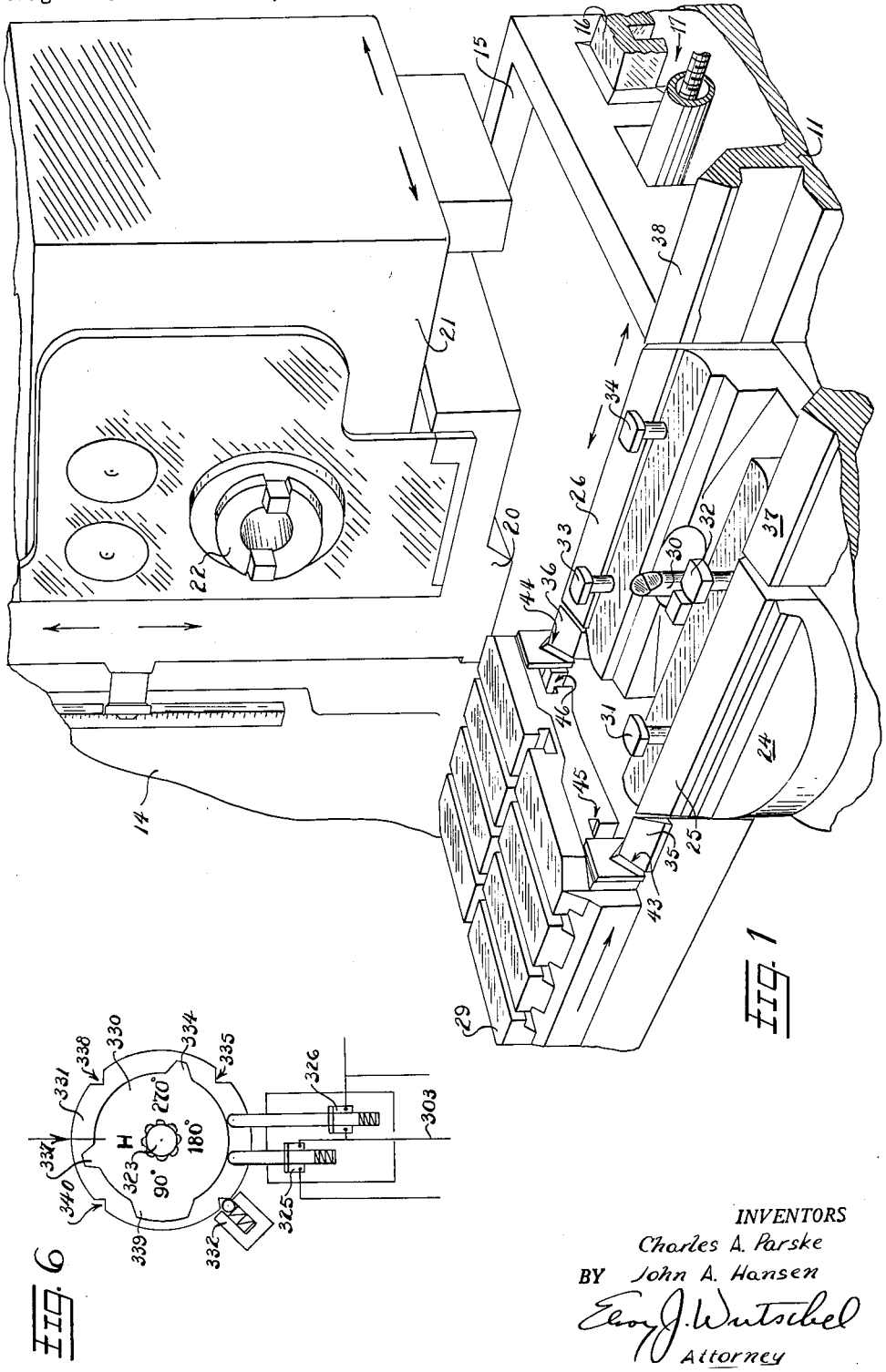
INVENTORS
Charles A. Parske
BY John A. Hansen
Eeny J. Wutschel
Attorney

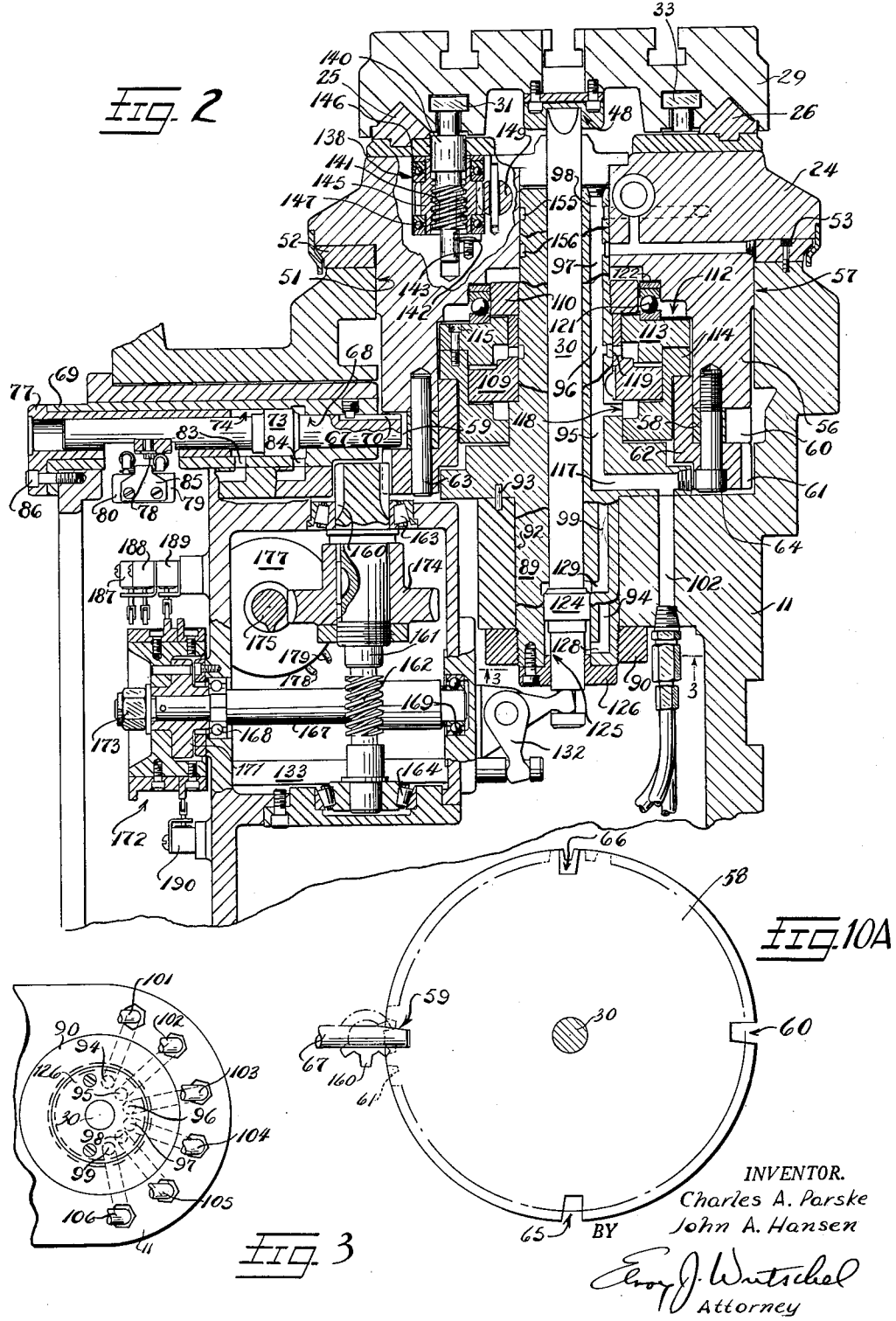

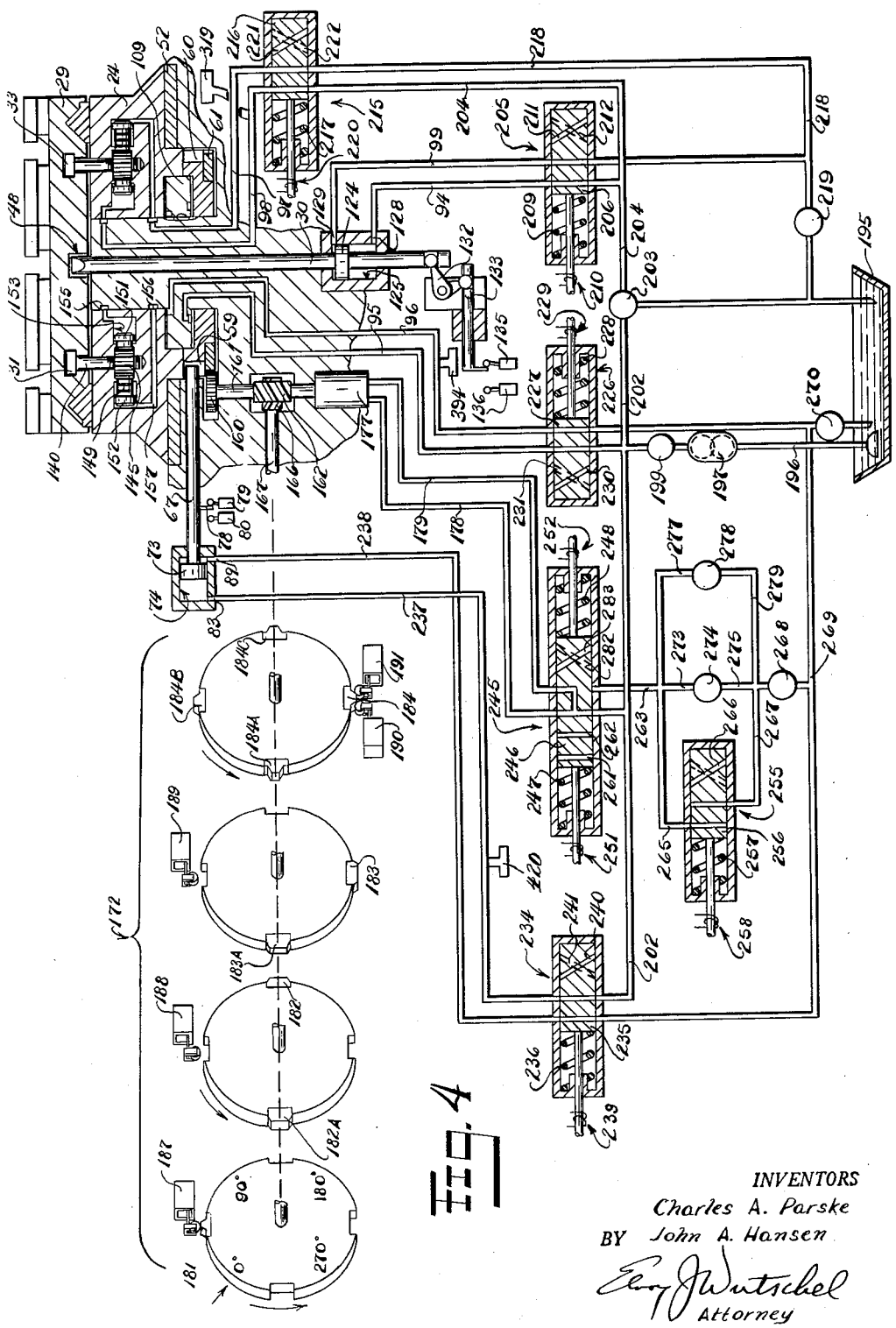

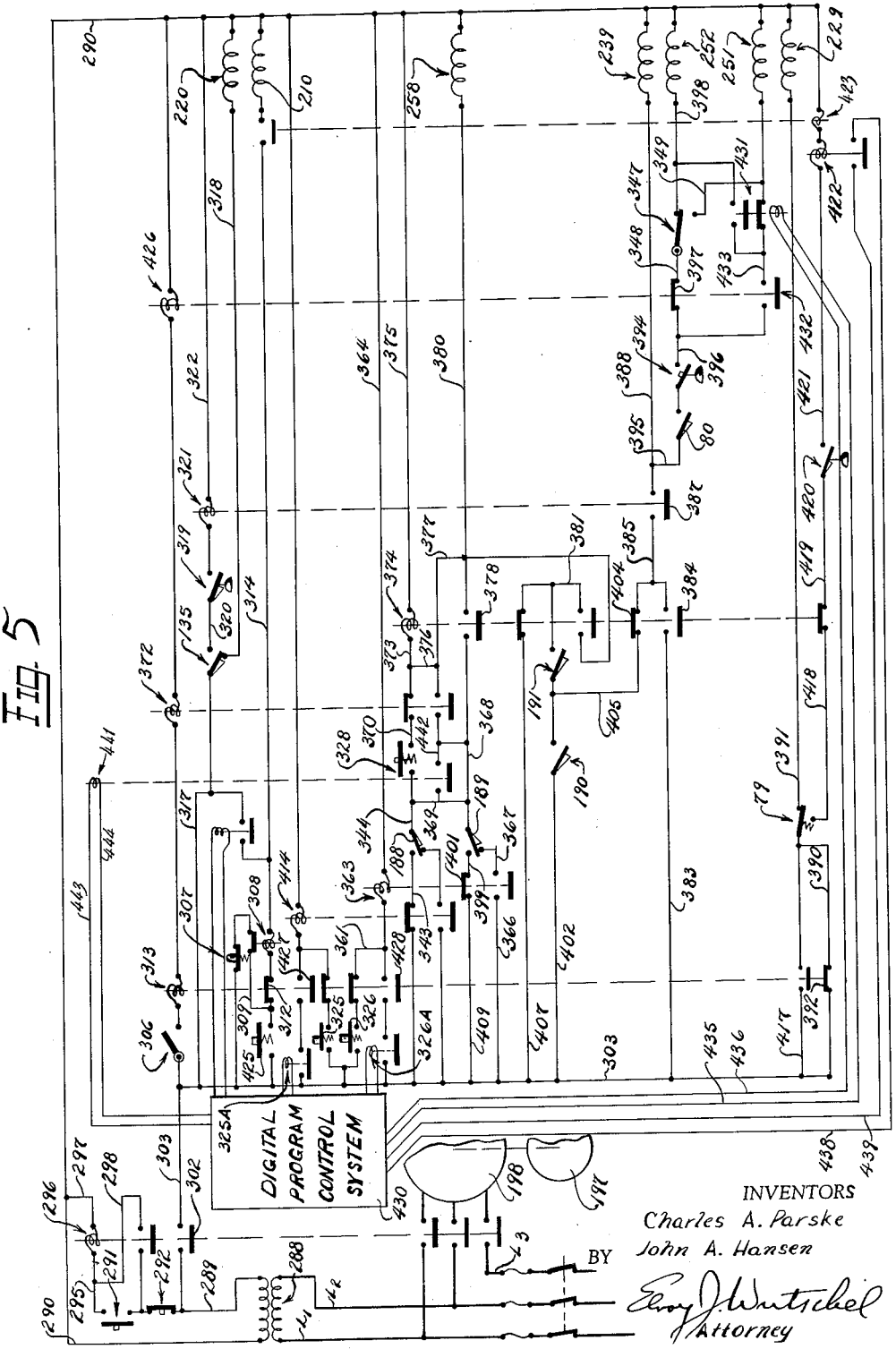

May 1, 1962  C. A. PARSKE ETAL  3,031,902
INDEX MECHANISM

Original Filed March 10, 1958  5 Sheets-Sheet 5

Fig. 7

| SELECTED TABLE POSITION | SELECTOR #325 | SELECTOR #326 | SWITCHES ACTUATED |||||  TABLE POSITION |
| --- | --- | --- | --- | --- | --- | --- | --- | --- |
| | | | #187 HOME | #188 | BINARY #189 | #190 | CREEP STOP #191 | |
| 0° | | | ▬ | | | ▬ | ▬ | 0° |
| 90° | X | | | ▨ | | ▬ | ▬ | 90° |
| 180° | | X | | | ▨ | ▬ | ▬ | 180° |
| 270° | X | X | | ▨ | ▨ | ▬ | ▬ | 270° |

Fig. 8

| BINARY SWITCH ACTUATION CLOCKWISE OR C.CW. (I) | CREEP-STOP SWITCH OVERLAP || STOP OVERLAP | CREEP |
| --- | --- | --- | --- | --- |
| | CLOCKWISE (II) | C.CW. (III) | | |
| CLOCKWISE ↓ 15°  C.CW. ↑ 15° | (diagram) 359 | (diagram) | 9° 9° | 9° 9° |

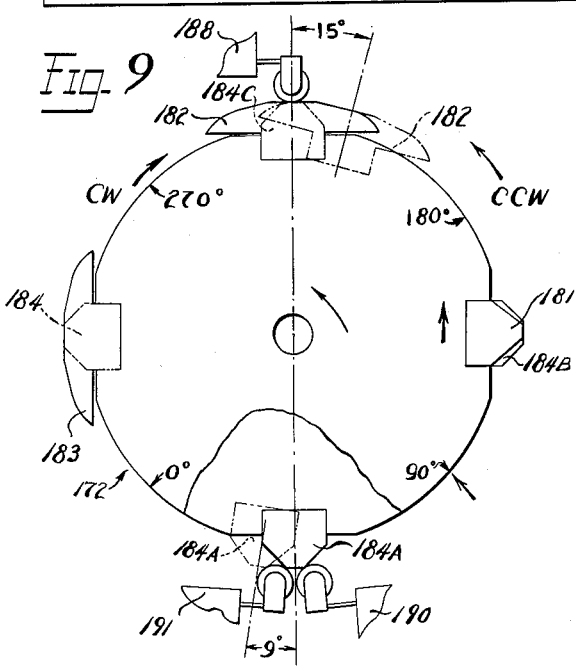

Fig. 9

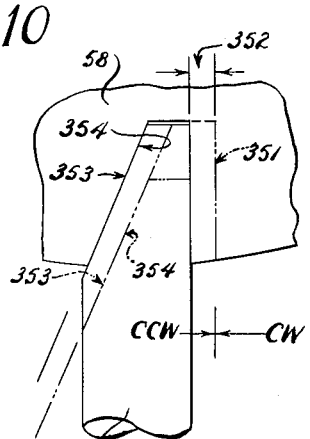

Fig. 10

INVENTORS
Charles A. Parske
BY John A. Hansen
Elroy J. Wutschel
Attorney

United States Patent Office 3,031,902
Patented May 1, 1962

3,031,902
INDEX MECHANISM
Charles A. Parske, Milwaukee, and John A. Hansen, Greendale, Wis., assignors to Kearney & Trecker Corporation, West Allis, Wis., a corporation of Wisconsin
Continuation of application Ser. No. 720,488, Mar. 10, 1958. This application May 22, 1959, Ser. No. 815,230
12 Claims. (Cl. 74—818)

This application is a continuation of our pending patent application, Serial No. 720,488 filed March 10, 1958, and now abandoned, for an Index Mechanism.

This invention relates generally to improvements in machine tools and, more specifically, to an improved indexing mechanism for a milling machine.

A general object of this invention is to provide an improved, selectively indexable work support for a machine tool.

Another object of the invention is to provide an improved control system for a selectively indexable machine tool work support.

Another object of the invention is to provide an improved control system for indexable machine tool work supports that provides for either sequential indexing from station to station or skip-stop indexing in which nonselected intermediate stations may be by-passed.

Another object of the invention is to provide an improved machine tool organization incorporating a tool spindle selectively movable along three mutually perpendicular axes, in combination with a cooperating selectively indexable work support.

Another object of the invention is to provide an improved machine tool organization comprising in part transfer way surfaces adapted to movably support work carrying pallets in combination with an indexable rotary support member adapted to receive a pallet, position it precisely, retain it in clamped position, and selectively index the pallet of different working stations.

A further object of the invention is to provide an improved indexable rotary table including operating mechanism for positioning and clamping a work supporting pallet thereto, as well as a control system for selectively indexing the table and pallet to selected working stations.

A further object of the invention is to provide an improved remote control system for an indexable machine tool work support that is adapted to effect both sequential indexing, as well as selective indexing in which certain intermediate stations are completely omitted from the indexing movement.

A still further object of the invention is to provide an improved electro-hydraulic indexing control system that is selectively presettable to effect movement of an indexable member to any selected index station in either direction and in any sequence.

A still further object of the invention is to provide an improved electrically presettable indexing control system including a plurality of switching means responsive to a member being indexed in a manner to by-pass any intermediate nonselected index stations.

According to this invention, an improved, indexable rotary table is incorporated in a machine tool provided with a power driven tool spindle carried for bodily movement in three mutually perpendicular planes relative to the rotary table. The indexable work support is provided with a retractable centering pin and a plurality of selectively actuatable clamps respectively positioned to precisely locate and clamp a work carrying pallet in predetermined position relative to the tool spindle. A sequentially operative electro-hydraulic control system is connected to actuate the centering rod for locating the pallet upon the table, and actuating the clamps to securely clamp the pallet to the rotary table. As these preliminary positioning and clamping operations are being effected, the indexable work support itself is maintained in clamping engagement with its supporting way surfaces, and a radially movable index plunger is retained in indexing engagement with a notch formed in the periphery of the indexable work support. After the work carrying pallet is secured to the indexable work support, the latter may be selectively advanced to one of a plurality of indexing stations in any sequence and in either clockwise or counterclockwise direction. To accomplish this, a selector switch is rotated to actuate selector switch contacts functioning in binary code fashion to establish anticoincidence circuits relative to binary switches connected to be cam actuated by table movement. Effecting anticoincidence between the selector switches and binary switches conditions the electro-hydraulic control circuit for retracting the index plunger, releasing the table clamp and initiating fast table movement. As the table passes any intermediate nonselected index position, shunt control circuits are automatically established to continue table movement. Upon approach of the table to the selected index station, however, binary cams associated therewith actuate the binary switches to condition the electrohydraulic control system for subsequently reducing the fast travel to creep rate, and stopping table movement. To this end, another cam operable within the range of binary cam operation effects sequential operation of a pair of creep-stop switches, irrespective of the direction of table movement. The arrangement is such that initial actuation of one of the creep-stop switches reduces table travel to a creep rate. Subsequent, coincident actuation of both creep-stop switches stops table movement, and sequential inward movement of the index plunger effects final precise positioning of the table. The table is then reclamped to its supporting ways. A particular advantage of the entire unitary electro-hydraulic control system is that one or more of the nonselected index stations may be by-passed as the table is indexed to the selected station. Another advantage of the invention is that the particular arrangement for coding signals to select required index stations in a desired sequence is particularly adapted to respond to an automatic digital control system. In such a case, the entire control system is connected for automatic mode of operation and the entire electro-hydraulic control circuit response to coded signals from a digital control system by means of selectively actuatable relays interposed in the control system.

The foregoing and other objects of the invention which will become more fully apparent from the following detailed description of mechanisms and a cooperating electro-hydraulic control circuit exemplifying a preferred embodiment thereof, may be achieved by the apparatus described herein in connection with the accompanying drawings, in which:

FIGURE 1 is an enlarged fragmentary view in perspective of a machine tool organization incorporating the invention;

FIG. 2 is a view in transverse vertical section through the supporting frame, the indexable support member, and a work carrying pallet with certain parts broken away to show the internal operating mechanism;

FIG. 3 is a view in horizontal transverse section, taken generally along the lines 3—3 in FIG. 2, and showing a portion of the hydraulic distributing system within the index table mechanism;

FIG. 4 is a schematic view, taken partly in fragmentary vertical section through the frame, indexable support member and pallet, and showing in combination therewith the hydraulic control circuit as well as an exploded perspective view of the coordinately rotatable cam control mechanism;

FIG. 5 is a diagrammatic view of the electrical control circuit;

FIG. 6 is a fragmentary view of the selector cam connected to effect operation of the selector switches;

FIG. 7 is a chart illustrating the binary code relationship between index selector switches and cam actuated binary switches, illustrating condition of both coincidence and anti-coincidence therebetween;

FIG. 8 is a chart illustrating the comparative duration in operation of the cam actuated binary switch and the creep-stop switches, illustrating the extent of creep-stop switch overlap;

FIG. 9 is a diagrammatic view in front elevation of the index control cam mechanism together with associated cam actuated switches;

FIG. 10 is an enlarged fragmentary, diagrammatic view illustrating the coaction between the index plunger and a cooperating table notch; and, FIG. 10A is an enlarged diagrammatic plan view of the table notch plate and cooperating index plunger for the table mechanism.

Referring more specifically to the drawings, the machine tool shown in FIG. 1 as incorporating a preferred embodiment of the invention is a milling machine having a principal supporting frame or bed 11. On its upper surface, the bed 11 is disposed to support an upwardly extending column 14 provided with an integrally formed base 15. The column base 15 is slidably carried for longitudinal movement by a pair of longitudinally extending ways secured to the bed 11, only one of which (16) is shown in FIG. 1. To effect longitudinal sliding movement of the column base 15 along the bed 11, there is provided a screw and nut translating mechanism 17 that is connected therebetween in well known manner. A vertically movable saddle 20 is slidably secured to the upwardly extending column 14 for selective vertical adjustment above the column base 15. A spindle head 21, in turn, is slidably carried by the saddle 20 for transverse movement, and is provided with a power driven rotatably journalled tool spindle 22. The usual power driven translating mechanisms (not shown) are connected in well known manner to effect vertical movement of the saddle 20 along the supporting column 14, as well as transverse movement of the spindle head 21 relative to its supporting saddle.

By means of this arrangement, the power driven tool spindle 22 is movable along three mutually perpendicular axes relative to an indexable rotary tabble 24 journalled on a forwardly extending portion of the bed 11. On its upper surface, the rotary table 24 is provided with a pair of spaced apart parallel way surfaces 25 and 26.

To position a work supporting pallet 29 in operative relationship to the bodily movable tool spindle 22, the rotary table 24 is provided with a vertically movable centering rod 30, as well as a plurality of vertically movable clamp elements 31, 32, 33 and 34. With the rotary table 24 positioned as shown in FIG. 1, the way surfaces 25 and 26 presented thereby are disposed to cooperate with a similar left pair of bed way surfaces 35 and 36, as well as a right pair of bed way surfaces 37 and 38.

It will be apparent that, with the table 24 positioned as shown in FIG. 1, the way surfaces presented thereby cooperate with the associated way surfaces presented by the bed 11 to constitute a continuous transfer pathway along which the work supporting pallet 29 may be moved by means of a transfer mechanism (not shown). The transfer mechanism, which does not constitute a part of this invention, is adapted to move a work supporting pallet, such as the work pallet 29, into proper operative relationship relative to the indexable rotary table 24, which in effect constitutes one working station for a plurality of successively positioned pallets (not shown).

To accomplish this, the pallet 29 is provided on its underside with a pair of complementary parallel way surfaces 43 and 44 disposed to slidably engage the bed way surfaces, and the table way surfaces 25 and 26. Likewise, the underside of the pallet 29 is provided with a pair of spaced apart parallel T-slots 45 and 46, so positioned as to be engaged by the clamp elements 31, 32, 33 and 34 as the pallet is advanced into operating position upon the rotary table 24. In addition, as shown in FIG. 2, the underside of the pallet 29 is provided with a centrally positioned index notch 48 that is engaged by the upwardly movable centering rod 30 to effect final precise positioning of the pallet 29. Thus, the pallet 29 and table 24 cooperate to constitute a selectively indexable work supporting table, operative to precisely position a workpiece relative to the bodily movable tool spindle 22. In actual operation, similar workpieces would be secured to the upper surfaces of a plurality of work carrying pallets, such as the pallet 29 in well known manner. Therefore, each workpiece and its associated supporting pallet 29, would be positioned in identical relationship to the tool spindle 22 as the pallet was advanced into position and clamped to the rotary table 24.

The supporting bed 11 is provided with an enlarged central bored opening 51, as shown in FIG. 2, and a horizontal circular bearing bed way structure 52, having a concentric bored opening, that is fixedly secured thereto by means of cap screws 53. The rotary table 24 presents a flanged way surface slidably engaging the bed way 52 and is integrally formed with a depending circular member 56. Engagement of the circular bed way 52 with the flanged table way surface maintains both the rotary table 24 and the pallet 29 in the proper horizontal plane. Likewise, engagement of the circular way surface 51 with a complementary circular bearing surface 57 formed toward the upper portion of the depending support 56 guides the rotary table 24 during indexing movement. A circular locating ring 58 presenting peripherally spaced locating notches 59 and 60 is fixedly secured to the underside of the circular depending table member 56. To retain the locating ring 58 in proper position, a ring gear 61 provided with an upwardly extending flanged hub 62 is secured by means of dowels 63 and cap screws 64 to the depending circular table member 56. In addition to the diametrically opposed locating notches 59 and 60, as shown in FIG. 10A, the ring 58 is provided with two other notches 65 and 66 making a total of four notches spaced 90° apart.

To effect final positioning movement of the rotary table 24 and retain it in selected position, a radially movable index plunger 67 is slidably mounted within a bored opening 68 formed in a horizontal, radially disposed sleeve 69 removably carried in a concentric horizontally bored opening in the frame 11. To prevent rotational movement of the index plunger 67, a longitudinal groove 70 formed toward the inner end thereof is engaged by the extending end of a dog point set screw carried by the sleeve 69. For radially moving the plunger 67, a piston 73 affixed toward the central portion thereof is carried within a hydraulic cylinder 74 formed by an enlarged bore in the sleeve 69. The rearward end of the cylinder 74 is delimited by the end face of a concentrically positioned tubular sleeve 77 that guidably supports the outwardly extending end of the plunger.

Hydraulic fluid under pressure admitted through a port 83 formed in the cylinder 74 urges the piston 73 inwardly to in turn urge the index plunger 67 into engagement with one of the four notches presented by the index ring 58, such as the index notch 59 shown in FIG. 2. At the same time, a cam 78 carried by the outer end of the plunger 67 actuates switch 79 to condition the control circuit for the next table movement, in this case urging the table 24 into clamping engagement with the circular bed way 52. At the start of an indexing cycle, pressure fluid admitted through a port 84 in the cylinder 74 urges the piston 73 outwardly thereby withdrawing the index plunger 67 from engagement with an index notch in the ring 58. As this happens, the cam 78 is likewise moved outwardly to condition the control mechanism for the next movement, which in this case would be unclamping the rotary table 24 and elevating it slightly to facilitate indexing movement. The index plunger 67 and the associated supporting sleeves 69 and 77 are so arranged as to be removable as a single unitary structure to facilitate assembly or inspection. To this end, a switch support bracket 85 carrying switches 79 and 80 is first removed after which, a cap screw 86 is removed to permit withdrawal of the sleeves 77 and 69 together with the index plunger 67. The vertically movable locating rod 30 is slidably carried in an upstanding circular post 89 of stepped diameter that is fixedly secured within the machine bed 11 in concentric relationship to the rotary table 24. At its lower end, the stationary post 89 is carried within a vertically bored opening 92 formed in a horizontal supporting web integrally formed with the machine bed 11. A clamp nut 90 threaded on the lower end of the circular post 89 retains an enlarged flanged shoulder formed on the post in abutting engagement with the upper horizontal face of the supporting machine web. A dowel 93 retains the stationary post 89 in proper position of angularity in a manner that outlets of radially drilled hydraulic lines formed in the enlarged flanged mid-section thereof are in proper registration with vertically bored hydraulic lines in the machine bed 11. The oil lines in the machine bed 11 together with the cooperating radial and vertical oil lines in the central stationary post 89 constitute a manifold arrangement for transmitting pressure fluid to the various hydraulically actuated control elements. This arrangement is shown more clearly in FIG. 3, in which vertical lines 94 to 99 inclusive are connected via radial lines formed in the enlarged flange to receive hydraulic fluid under pressure from vertical inlet lines 101 to 106 inclusive.

As shown in FIG. 2, a stationary circular piston 109 keyed to the central portion of the tubular post 89 is fixedly maintained in abutting engagement with a shoulder formed thereon by means of an upper circular clamp nut 110.

A cooperating vertically movable hydraulic cylinder 112 encircles a portion of the stationary post 89 and the stationary piston 109 secured thereto in a manner to define hydraulic fluid chambers above and below the piston. The movable cylinder 112 comprises an upper flanged circular section 113 that is fixedly secured to a lower section 114 by means of circumferentially spaced cap screws 115.

For urging the rotary table 24 into clamping engagement with the circular bed way 52, hydraulic fluid under pressure is admitted from the line 102, via radial line 117, vertical line 95, to an inlet port 118. Pressure fluid through inlet port 118 urges the cylinder 112 downwardly relative to the stationary piston 109. Thus, a flanged shoulder formed on the lower cylinder section 114 exerts downward pressure upon the ring gear hub 62 to in turn urge the rotary table 24 downwardly into clamping engagement with the bed way 52.

To release the table clamp, fluid under pressure is transmitted from the line 103, FIG. 3, through the radial line connected to vertical line 96, and thence to an inlet port 119, FIG. 2. Fluid under pressure through inlet port 119 effects upward movement of the hydraulic cylinder 112 relative to the stationary piston 109, thereby releasing the downward clamping pressure upon the rotary table 24. Continued upward movement of cylinder 112 in turn elevates an antifriction thrust bearing 121 and a thrust washer 122 seated within an annular shoulder formed on the depending table member 56, thereby elevating the rotary table 24 slightly above the supporting bed way 52.

For moving the locating rod 30, a piston 124 secured thereto is constrained to slide in a cylinder 125 formed within the lower end of the post 89, and delimited at its lower end by a flanged plate 126 secured directly to the post. A lower inlet port 128 opening into the cylinder 125 is connected to receive hydraulic fluid under pressure from the vertical drilled line 94 for moving the piston 124 upwardly and urging the rod 30 into engagement with the locating notch 48 presented by pallet 29. Conversely, with line 94 open to exhaust, admission of pressure fluid from line 106 via the vertical line 99 to the inlet port 129 moves the piston 124 downwardly to retract the locating rod 30. Vertical movement of the rod 30 is effected only when the rotary table 24 is returned to its 0° or "home" starting position, in which transfer ways 25 and 26 are properly aligned with the cooperating bed ways.

In a similar manner, the rotary table 24 must be in "home" position, engaged by the radial index plunger 67, and clamped to the bed way structure 52 as a prerequisite to automatic operation of the four pallet clamps 31, 32, 33 and 34. Operation of the pallet clamps is likewise coordinated with the operation of the pallet locating rod 30. Assume now that the pallet clamps 31, 32, 33 and 34 are in upward unclamped position, as shown in FIG. 1, and the pallet locating rod 30 is retracted. As the work carrying pallet 29 is advanced into position on the rotary table by the transfer mechanism (not shown) the locating rod 30 is first moved upwardly to position the pallet 29. To indicate that the rod 30 is engaged, the lower end thereof is provided with an annular groove engaging one end of a pivotable bell crank 132, as shown in FIGS. 2 and 4. The opposite arm of the bell crank 132 engages a transverse slot in a horizontal rod 133 slidably carried with the bed 11. With the locating rod 30 elevated, the actuating rod 133 is moved rightwardly to engage a switch 135 to indicate that the pallet is properly located, and to condition the circuit for automatic clamping of the pallet to the supporting way. Conversely, with the locating rod 30 retracted, the bell crank 132 is pivoted in clockwise direction to urge the rod 133 leftwardly to actuate a transfer ready switch 136.

The clamping mechanisms respectively connected to effect simultaneous operation of the pallet clamps 31, 32, 33 and 34 are of identical construction. Therefore, only the mechanism 138 associated with the clamp element 31, as shown in FIG. 2, will be described in detail. As there shown, the clamp element 31 is secured to the upper end of an axially movable shaft 140 having formed on its lower central section screw threads 141. At its lower end, the shaft 140 is provided with an arcuate groove 142 engaging the enlarged head of a fillister head screw 143 threaded in the table 24 to restrain the clamp element 31 against rotation, while permitting the required vertical movement thereof. The threaded portion 141 of the shaft 140 is engaged by a rotatable nut 145 journalled in an upper bearing 146 and a lower bearing 147 carried within a circular bored recess in the table 24. The rotatable nut 145 is provided on its periphery with gear teeth that are engaged by rack teeth presented by an axially movable rack 149 carried in a horizontally bored opening formed within the rotary table 24.

As shown in FIG. 4, the rack 149 is provided at its opposite ends with integrally formed pistons 151 and 152 respectively fitted within the opposite ends of a hydraulic cylinder 153. The central portion of the hydraulic cylinder 153, between the pistons 151 and 152, is open to permit the rack 149 to engage the gear teeth presented by the rotatable nut 145. As viewed in FIG. 4, leftward movement of the rack 149 effects downward movement of the clamp element 31 to urge the pallet 29 into clamping engagement with way surfaces 25 and 26 respectively. To accomplish this, hydraulic fluid under pressure is transmitted from line 98 to an annular collector groove 155 formed on the periphery of the circular post 89. From the collector groove 155, the flow of pressure fluid continues through a drilled line formed in the rotary table 24 into the hydraulic cylinder 153 to urge the piston 151 and rack 149 in a leftward direction. The annular collector groove 155 likewise communicates with the clamp actuating piston associated with the clamp element 33, as well as clamp actuating pistons (not shown) associated with clamp elements 32 and 34, FIG. 1. To disengage the pallet clamp elements, the annular collector groove 155 is connected to exhaust, and, at the same time, fluid under pressure is transmitted from hydraulic line 97 to an annular collector groove 156 formed in the periphery of the post 89. From the groove 156, fluid under pressure continues through an inlet port and drilled line 157 to the opposite end of the hydraulic cylinder 153, thereby urging the piston 152 and rack 149 in a rightward direction. Hydraulic fluid under pressure from the unclamping collector groove 156 is simultaneously transmitted to actuate the unclamping piston associated with the clamp element 33, as well as the unclamping pistons (not shown) associated with the other two clamp elements 32 and 34, FIG. 1.

With the pallet 29 clamped to the table 24, and the locating rod 30 engaged, the entire structure including the supporting rotary table 24 and work pallet 29 may be selectively indexed as a single unitary structure. As hereinbefore explained, each indexing cycle includes the preliminary operations of first withdrawing the table index plunger 67, FIG. 2, and urging the cylinder 112 to elevate the table 24 slightly. Likewise, at the conclusion of the indexing cycle at a selected station, the index plunger 67 is re-engaged to effect final positioning and the table 24 is again urged downwardly into clamped engagement with the way support 52.

To rotate the table 24, as shown in FIGS. 2 and 4, the ring gear 61 is engaged by a drive pinion 160 secured to a vertical shaft 161 journalled within the frame 11 by bearings 163 and 164. The shaft is integrally formed with a worm 162 disposed to engage a worm wheel 166 affixed to a horizontal shaft 167 rotatably journalled in bearings 168 and 169. A hub 171 pinned to the outwardly extending end of shaft 167 is disposed to removably support a control cam mechanism 172. A nut 173 threaded on the end of the shaft 167 removably retains the control cam mechanism 172 in dowelled engagement with the hub 171. Power for rotating the worm shaft 162 and the drive pinion 160 in synchronism is derived from a worm wheel 174 keyed to the central portion of the shaft. The worm wheel 174 is meshingly engaged by a horizontally journalled worm 175 that is connected to be rotated by a fluid motor 177. As shown in FIGS. 2 and 4, hydraulic fluid under pressure for driving the motor 177 in a clockwise or counterclockwise direction is respectively derived from a pair of hydraulic supply lines 178 and 179. By means of this arrangement, both the rotary table 24 and the control cam mechanism 172 are rotated in synchronism, in either clockwise or counterclockwise direction as required.

As schematically shown in FIG. 4, the control cam mechanism 172 constitutes a cam drum provided with separate cams or cam lobes 181, 182, 183 and 184 spaced both axially and peripherally relative to each other. Each of the cam lobes 181, 182, 183 and 184 coacts with adjacently positioned switches 187, 188, 189, and a pair of coincidently operable creep-stop switches 190 and 191. With the cam mechanism 172 positioned as shown in FIG. 4, the table is in its "home" or 0° position; creep-stop switches 190, 191 are coincidently operated to open position by cam lobe 184 to stop table movement in its "home" position. The 0° or "home" indicating switch 187 is opened by smaller cam lobe 181 within the range of operation of creep-stop switches 190, 191 for indicating that the table has been moved to a position which will allow pallet transport.

Cam lobes 182, 182A and 183, 183A are respectively spaced both axially and peripherally to actuate binary switches 188 and 189. Creep-stop switches 190, 191 are disposed to be actuated by one or another of the four cam lobes 184, 184A, 184B and 184C. The arrangement is such that the cam mechanism 172 coacts with the associated switches 188 to 191 inclusive for by-passing nonselected index stations, as well as indicating an approach to a selected index station, slowing indexing movement to a creep speed and finally stopping index movement upon coincident operation of creep-stop switches 190 and 191.

The complete hydraulic system, including both the hydraulically actuated pistons and the solenoid controlled valves, are selectively operable in predetermined sequence. As shown in FIG. 4, hydraulic fluid is withdrawn from a sump 195, within the machine bed 11, through a line 196 by means of a pump 197 driven by an electric motor 198, FIG. 5. From the pump 197, FIG. 4, the flow of hydraulic fluid continues through a main pressure regulating valve 199 to a main supply line 202. As soon as drive motor 198 is energized and the line 202 supplied with hydraulic fluid under pressure, the entire hydraulic system is dynamically activated and the various pistons assume the positions required by the position of the respective solenoid actuated hydraulic valves. From the line 202, the flow of hydraulic fluid continues in one direction through a pressure reducing valve 203 to a reduced pressure supply line 204. A solenoid actuated hydraulic valve 205 is connected to receive hydraulic pressure fluid from the line 204 for selectively actuating the pallet locating rod piston 124. With a valve spool 206 of the valve 205 biased rightwardly by a spring 209, a flow of fluid from line 204 is transmitted through a drilled line in the valve spool to the supply line 94, and thence to the hydraulic cylinder 125 for urging the locating rod piston 124 upwardly. At the same time, the cylinder outlet port 129 is connected via the line 99 through another drilled line in the valve spool 206, through an exhaust line 218, and a check valve 219 to the sump 195.

To retract the locating rod 30, a solenoid 210 is energized, thereby effecting leftward movement of the valve spool 206. With this condition existing, the line 94 is then connected via a drilled line 211 in the valve spool 206 to the exhaust line 218. At the same time, fluid under pressure is transmitted from the line 204, a valve spool line 212, and the line 99 to the cylinder 125 for urging the locating rod piston 124 downwardly.

For urging the four pallet clamps into downward clamped engagement with the pallet, there is provided a solenoid control valve 215. With a valve spool 216 of the valve 215 biased in a rightward direction by means of a spring 217, the hydraulic line 204 is connected to transmit pressure fluid through a drilled line in the valve spool, and thence through the line 98 to the annular collector groove 155 formed in the stationary post 89. As hereinbefore explained, hydraulic pressure fluid from the collector groove 155 is then transmitted to actuate the pistons respectively associated with the four clamp elements 31, 32, 33 and 34 shown in FIG. 1. With this condition existing, the pallet 29 is securely clamped to the table 24, and the lower annular collector groove 156 is connected to exhaust via the line 97, a drilled line in the valve spool 216 to the main exhaust line 218.

To disengage the four clamp elements, a solenoid 220 associated with the valve 215 is energized to effect leftward movement of the valve spool 216. Leftward movement of the valve spool 216 effects an immediate connection of the line 98 through valve spool line 221 to the exhaust line 218. At the same time, pressure fluid is then transmitted from the supply line 204, the valve spool line 222, the drilled line 97, annular collector groove 156 to the clamp actuating pistons for effecting upward disengaged movement of the four clamp elements.

For activating the fluid motor 177 to index the table 24, a solenoid controlled valve 245 is interconnected between the main high pressure supply line 202 and the motor supply lines 178 and 179. With a spool 246 of the valve 245 maintained in a central neutral position by springs 247 and 248, as shown in FIG. 4, pressure from the line 202 flows through lines in the valve spool to both of the lines 178 and 179. Thus, pressure from the motor supply lines 178 and 179 is supplied to the fluid motor 177 to maintain the motor in a dynamic stop condition. In order to activate the motor 177 for rotation in either a clockwise or counterclockwise direction, the valve spool 246 is connected to be moved in the required direction by energization of a coil 251 or a coil 252.

Electrical actuation of motor control valve 245 is coordinated with the electrical actuation of a rate change valve 255. With a valve spool 256 resiliently urged rightwardly by a spring 257, the fluid motor 177 is either in a stop position, as shown, or conditioned for operating at a slow creep rate of speed, depending upon the position of the motor control valve spool 246. Whenever a solenoid 258 of the valve 255 is energized to effect leftward movement of the valve spool 256, and the motor control valve 245 is in either end position, the fluid motor 177 is connected to drive the worktable 24 at a fast rate of travel.

To move the rotary table in an indexing movement in a clockwise direction, the control circuit shown in FIG. 5 is connected to effect simultaneous energization of the motor control valve solenoid 252 and the rate change valve solenoid 258. Thus, the valve spool 246 is moved rightwardly and the valve spool 256 leftwardly. With this condition existing, hydraulic fluid under pressure is transmitted from the supply line 202 via a line 261 in the valve spool 246 and thence through the hydraulic line 178 to effect clockwise rotation of the fluid motor 177. Fluid is exhausted from the motor at a controlled, rapid rate via line 179, and a line 262 in the valve spool connected to a line 263. With the rate change valve spool 256 energized to its leftward position, the major flow of pressure fluid from the line 263 continues through a line 265, a line 266 in the valve spool 256, to a line 267. From the line 267, the flow of pressure fluid continues through a predeterminately adjusted throttle control valve 268 to an exhaust line 269 that is connected through a check valve 270 to the sump 195. At the same time, a much smaller volume of pressure fluid continues from the line 263, through a line 273, a throttle regulating creep control valve 274, and thence through a line 275 to the high speed throttle control valve 268.

As the rotary table 24 approaches its selected indexed position, the rate change valve solenoid 258 is de-energized, as will hereinafter be more fully explained. This permits rightward resiliently biased movement of the valve spool 256 in response to the spring 257 causing the speed of the motor 177 to be reduced to a creep rate. Rightward movement of the valve spool 256 blocks the flow of pressure fluid from the line 265, thereby causing fluid from the line 263 to flow directly through the line 273 and the throttle regulating creep control valve 274. To compensate for the sudden surge of pressure at the moment the valve spool 256 returns to its rightward position, there is provided an additional shunt circuit extending from the line 263, a line 277, a pressure relief valve 278, and a line 279 connected through the high speed throttle regulating valve 268 to the exhaust line 269. The pressure relief valve 278 operates momentarily to relieve the sudden surge of pressure, immediately prior to the back pressure from the line 263 being completely regulated by the creep control throttle valve 274. As the rotary table 24 arrives at the selected indexed position, the motor control valve solenoid 252 is de-energized, permitting resiliently biased return of the valve spool 246 to its central neutral position. At this moment, rotational movement of the fluid motor 177 stops, and the table index plunger 67 is again urged inwardly to effect final precise positioning of the rotary table 24 in its selected position.

The throttle control valves 274 and 268 are manually adjustable to control the rotational rate of the fluid motor 177 by regulating the volume and rate of fluid flow through the return line 263. The control valve 268 is adjusted to permit the required rapid rate of table indexing movement. The throttle control creep valve 274 is adjusted to provide for a greatly reduced rate of table movement to preclude overtravel at the moment table movement is to be stopped.

In a similar manner to that hereinbefore described, counterclockwise rotation of the worktable 24 may be effected by simultaneously energizing the motor control valve solenoid 251 and the rate change solenoid 258. Energization of the solenoid 251 effects leftward movement of the motor control valve spool 246 thereby permitting a flow of pressure fluid from the main supply line 202 through the drilled line 282, the hydraulic line 179 to effect counterclockwise rotation of the fluid motor 177. A return flow of hydraulic fluid from the motor 177 continues through the line 178, a line 283 in the valve spool 246 to the line 263. It will be apparent that the operation of the rate change valve 255 for controlling the return flow of fluid from the line 263 is identical to that hereinbefore described when the worktable is indexably moved in a clockwise direction.

The various solenoid valves shown in FIG. 4 are operatively connected to be actuated by means of a control circuit shown diagrammatically in FIG. 5. As there shown, power from the usual three phase source is transmitted by means of a fused disconnect switch to line conductors $L_1$, $L_2$ and $L_3$. The conductors $L_1$ and $L_2$ are connected to energize the primary winding of a transformer 288, the secondary winding of which is connected to supply current of reduced voltage to a control circuit by means of conductors 289 and 290. To energize the control circuit, a master start button switch 291 is momentarily depressed to complete a circuit from energized conductor 289, the normally closed contact bar of a stop button switch 292, thence through the momentarily closed contact bar of start switch 291 to a conductor 295. The flow of current continues from the conductor 295 through the coil of a master start relay 296 to a conductor 297 connected to the energized conductor 290. With the start relay 296 energized to upward closed position, a holding circuit is then completed from the conductor 397, the coil of the relay 296, a conductor 298, through the upper closed contact bar of the relay, and through the closed stop button switch 292 to the energized conductor 289. With this condition existing, the three lower contact bars of the relay 296 are moved upwardly into bridging engagement with associated branch conductors to transmit current from line conductors $L_1$, $L_2$ and $L_3$ to energize the motor 198 for driving the pump 197. At the same time, a circuit is completed from the energized conductor 289, through the closed contact bar 302 of the relay 296 to energize a control circuit conductor 303.

With the pump 197 operating to supply hydraulic fluid under pressure to the hydraulic circuit, FIG. 4, and the control circuit of FIG. 5, energized, the index table is connected to be selectively indexed in either a manual or automatic mode of operation. The control circuit is connected to be operated in manual mode whenever a switch 306 is in upward disengaged position, as shown in FIG. 5.

Before describing selective indexing during manual mode, it will be assumed that the work supporting pallet 29, as shown in FIG. 1, has not yet arrived on the rotary table 24. Likewise, it will be assumed that the pallet locating rod 30 is retracted and the pallet clamps 31, 32, 33 and 34 are disengaged. To accomplish this, the locating rod solenoid 210 and the pallet unclamping solenoid 220 are energized as hereinbefore explained. As shown in FIG. 5, a holding circuit is completed from the energized conductor 303, through the contact bar of a normally closed pallet pin switch 307, and thence through the closed contact bar of an energized relay 308 to a conductor 309. From the conductor 309, the flow of current continues through a normally closed contact bar 312 of the relay 313, through the coil of the holding relay 308 to a conductor 314. From the conductor 314, the flow of current continues through the closed contact bar of index completed relay 423 to solenid 210 and thence to the energized conductor 290. With the solenoid 210 energized, the pallet locating rod 30 is in downward retracted position, FIG. 4, thereby permitting the contact bar of the switch 135 to return to its normally closed position, as shown in FIG. 5. A circuit is thus completed from the energized conductor 303, a conductor 317, contact bar of closed switch 135, conductor 318, and thence completed through the solenoid 220 to energized conductor 290.

It will now be assumed that the work pallet 29 is transferred along the ways 35, 36 into a position on the rotary table 24. As soon as the pallet arrives in proper position upon the rotary table 24, the switch 307 is momentarily depressed to interrupt the holding circuit to the coil of the relay 308, thereby de-energizing the solenoid 210, as well as the solenoid 220. De-energization of solenoid 210 permits resiliently biased operation of valve 205, FIG. 4, to effect hydraulically actuated upward locating movement of the rod 30 and actuation of the switch 135, FIG. 5, to interrupt the holding circuit to solenoid 220. De-energization of solenoid 220, in turn, permits resiliently biased rightward movement of valve spool 216, FIG. 4, to effect hydraulically actuated clamping engagement of the pallet 29 to the table 24. Clamping pressure through the line 98 operates a pressure actuated switch 319. This in turn completes another holding circuit from the energized conductor 303, conductor 317, the upwardly closed contact bar of switch 135 to a conductor 320. From the conductor 320 the circuit continues through the closed contact bar of the pressure actuated switch 319, through the coil of a pallet ready relay 321, to a conductor 322 connected to the energized conductor 290. Whenever the locating rod 30 is engaged and the pallet 29 is clamped to the table 24, as described, the relay 321 is retained in upwardly engaged position to permit subsequent retraction of the index plunger 67, FIG. 4, from engagement with its home position index notch.

In addition to the pallet 29 being properly engaged by the rod 30 and clamped to the table 24, the table 24 in turn is clamped to the supporting bed and engaged by the index plunger 67 at the start of any indexing cycle. Thus, the solenoids 239 and 229 respectively associated with valves 234 and 226 are de-energized at the start of an index cycle. A principal advantage of this invention is the provision for moving the table to any selected index station, by-passing any nonselected stations between the starting point and the selected index position. This is accomplished electrically, either in a manual mode or an automatic mode of operation. In either case, it is not necessary to predeterminately position any stop dogs or mechanical devices.

In the manual mode of operation, a position selector knob 323, FIG. 6, is first rotated to indicate the desired table position, and effect a concomitant actuation of a pair of selector switches 325 and 326. After this, an index cycle start switch 328, FIG. 5, is momentarily depressed to initiate the indexing cycle.

With the selector knob 323 positioned as shown in FIG. 6, both of the selector switches 325 and 326 are disengaged since the switch plungers thereof are engaged by the reduced diameter of a cam 330. Both the cam 330 and a detent notch plate 331 are connected to be rotated by the position knob 323. As schematically indicated in FIG. 6, the cam plate 330 carries indicia including H (for "home" or 0° position), 90°, 180° and 270° respectively disposed to be read against an indicating arrow for indicating the selected table position. With the knob 323 positioned as shown in FIG. 6, a notch presented by the detent plate 331 is engaged by a spring pressed detent 332. Rotation of the selector knob 323 to the 90° position moves a cam lobe 334 into engagement with the plunger for the switch 325, thereby actuating it to closed position. With this condition existing, a detent notch 335 is engaged by the spring detent 332. With the selector knob 323 in the 180° position, a cam lobe 337 is operative to actuate the selector switch 326, a detent notch 338 engaging the detent 332. In a similar manner, the selector knob 323 may be positioned for a 270° index position, in which case the enlarged cam lobe 339 is operative to retain both selector switches 325 and 326 in closed position, with a notch 340 engaging the spring detent 332.

In manual mode, a single index cycle is initiated upon momentary manual closure of index cycle switch 328, FIG. 5, as long as coincidence does not exist between the selector switches 325, 326 and the binary switches 188, 189. Indexing movement of the table continues until coincidence of operation is established between the predeterminately actuated selector switches 325, 326 and the cam actuated binary switches 188 and 189. With both selector switches 325 and 326 in open position as shown in FIG. 5 and cam actuated switches 188 and 189 positioned as there shown, coincidence already exists between these two sets of switches. Therefore, no indexing movement would be effected upon closure of cycle start switch 328. In the event selector switch 326 is moved to closed position, indexing movement would be started upon closure of cycle start switch 328. Coincidence between the selector and binary switches would then occur as soon as the contact bar of switch 189 is cam actuated to its upper engaged position in bridging engagement between conductors 399 and 368. Coincidence in operation between the selector switches 325, 326 and binary switches 188, 189 does not actually stop indexing movement, but merely conditions the circuit for reducing indexing rate to creep speed, and subsequent stopping upon sequential operation of creep-stop switches 190, 191. Referring to FIG. 4, it will be apparent that the creep-stop switches 190 and 191 are actuated each time the cam 194 rotates 90°.

To preclude stopping of the cam mechanism and table 29 in a nonselected index station, therefore, it is necessary that the creep-stop switches be rendered ineffective at any nonselected intermediate positions. To this end, the control circuit is so arranged that a lack of coincident operation of binary switches 188, 189 to selector switches 325 and 326 establishes shunt control circuits whenever one or another of the creep-stop switches is actuated at a nonselected position. Likewise, the circuit is so arranged that the binary anti-coincidence circuit is rendered inactive during those portions of a revolution when the creep-stop switches 190, 191 are not actuated. The binary anti-coincidence circuit is bridged, in those cases, by a series connection of switches 190, 191. This effect is necessary in order to render the binary cam operated switches inactive until the switches are definitely indicating that the desired index is approaching, i.e. to eliminate the effect of contact bounce of the effect of none of the switches being actuated at some interval between each index station. The duration of creep-stop switch actuation occurs within the overall range of binary switch operation. This is due to the configuration of the various cam lobes presented by the cam mechanism 172 as schematically indicated in FIG. 9.

The binary code scheme of operation is illustrated in FIG. 7. As there shown, the chart indicates the position of the selector knob 323, as well as the actuation of selector switches 325, 326 for a particular desired index position. The corresponding actuation of the "home" indicating switch 187, binary code switches 188 and 189, as well as creep-stop switches 190 and 191 upon arrival of the table in selected position is likewise illustrated. Upon arrival of the table in selected position, as shown in FIG. 7, there is coincidence of operation between the selector switches 325, 326 and cam actuated binary switches 188, 189. Likewise, there is coincidence of operation between the creep-stop switches 190 and 191, which condition effects the stopping of the fluid motor 177. As shown in FIG. 7, coincident actuation of switches 190, 191 occurs at the same position of the cam mechanism 172 irrespective of the direction of approach. However, due to the mechanical differential in operation of each of the switches 190, 191, the table and cam mechanism can be rotated slightly without re-engaging either of the switches. Thus, there is provided an overlap in the operation of switches 190, 191 that permits final precise positioning of the table in response to the plunger without disrupting the actuated condition of the switches 190, 191.

Before describing the control circuit, the sequence of switch actuation to change from rapid to creep rate, stopping table movement, and final indexing movement of the table may be more clearly explained with reference to FIGS. 7 to 10 inclusive. It will now be assumed that indexing is to be effected in a counterclockwise direction from 180° position to the 90° position. To accomplish this, a reverse switch 347 is moved from the position shown in FIG. 5 into bridging engagement between conductors 348 and 349. The selector knob 323 is then positioned to actuate selector switch 325 for effecting the 90° table position. Immediately, there is anti-coincidence established between the selector switch (90° position) and the binary switches (180° position) as indicated by the chart in FIG. 7. With the index cycle started, the cam 182 actuates the binary switch 188 when the cam mechanism 172 and the table are approximately 15° from the selected 90° position. Counterclockwise rotation continues a few more degrees until the cam 184A actuates the creep-stop switch 191 to initiate creep movement when the cam and table are approximately 9° from the selected 90° position. The switch 191 is retained in open actuated position by the cam 184A as the cam mechanism continues to rotate in a counterclockwise direction at the reduced creep rate of travel. As soon as the approximate selected 90° position is reached, cam 184A effects coincident actuation of both switches 191 and 190 to stop counterclockwise table movement. With the table moving to a 90° position in a counterclockwise direction as described, the table notch ring 58 overtravels the radial position of the index plunger 67, as shown in FIG. 10, until it reaches the broken line position 351. The extent of overtravel is indicated at 352. Final accurate positioning is then effected in a clockwise direction by the cam face 353 of the index plunger 67 engaging the slightly displaced cam face 354 of the 90° index notch as shown in FIG. 10. Continued inward movement of the index plunger 67 effects final positioning of the table notch ring 58 and table in a clockwise direction until it arrives at its solid line position.

In the event the table was advanced to its 90° position in a clockwise direction, the table notch stops slightly short of the radially positioned index plunger 67, as indicated by line 351. As clearly shown in FIG. 10, inward movement of the index plunger 67 again effects final clockwise positioning movement of the table notch ring 58 and table until the plunger reaches its solid line position. In either clockwise or counterclockwise indexing movement, the distance at 352 indicates the extent of final plunger actuated clockwise positioning movement.

The extent of stop switch overlap is indicated in chart form in FIG. 8. As there shown, the broken line 359 indicates the precise point at which coincident operation of creep-stop switches 190 and 191 is effected to stop table movement in either direction. As shown in FIG. 8, the shaded rectangle below line 359 in column I indicates the extent of binary switch actuation in approaching a selected index position in a counterclockwise direction. The small shaded rectangles above the line 359 in column III indicate the extent of stop overlap of switches 190 and 191, while the elongated shaded rectangle below the line indicates the duration of creep rate in the counterclockwise indexing movement. In a similar manner, the shaded rectangle above line 359 in column I indicates the duration of binary switch actuation in clockwise indexing movement. Stop switch overlap in clockwise indexing is displaced below the stop line 359 as indicated in column II, with the shaded rectangle above the line indicating the extent of creep travel. Thus, the stop overlap is sufficient to permit a slight angular displacement of the cam mechanism 172 and table during final positioning without disturbing the condition of the creep-stop switches 190, 191.

A comparison of FIG. 8 with FIG. 7, shows the line 359 as indicating an average stop position for both binary switch actuation and creep-stop switch actuation, the latter being shown only in stop overlap condition. The electrical stop position 359, FIGS. 7 and 8, coincides with the actual stop position 351, FIG. 10, of the table and notch ring 58, irrespective of the direction of indexing movement.

Referring now to FIG. 5, the index selector switches 325 and 326 as well as the binary switches 188 and 189 are in coincident open position, with the table in "home" position, as hereinbefore explained. It will now be assumed that the table is to be advanced from "home" position to its 180° index station; and that the selector knob 323 has been positioned to actuate selector switch 326 to closed position for obtaining a 180° indexing movement. Closure of switch 326, FIG. 5, completes a circuit from energized conductor 303 through the closed contact bar of switch 326, the normally closed contact bar of relay 313 to a conductor 361. The flow of current continues from conductor 361, through the coil of binary control relay 363, and thence through a conductor 364 to the energized conductor 290. With this condition existing and the switch 396 in open manual mode position, cycle start switch 328 is momentarily depressed to initiate an indexing cycle from 0° to 180° position. This completes a circuit from energized conductor 303, via a conductor 366, the upwardly closed lower contact bar of energized relay 363 to a conductor 367. The circuit continues through the closed contact bar of binary switch 189, conductor 368, conductor 369, and thence through the momentarily closed contact bar of switch 328 to a conductor 370. From conductor 370, the flow of current continues through the normally closed contact bar of de-energized relay 372, a conductor 373, the coil of a control relay 374 to a conductor 375 connected to energized conductor 290.

A holding circuit for retaining the relay 374 in upward closed position is completed from the conductor 375, through the coil of the relay to the conductor 376 connected via conductor 377 through the upwardly closed contact bar 378 to energized conductor 368. At the same time, a holding circuit is established from the energized conductor 368, closed contact bar 378, via conductor 380 to energize the solenoid 258 connected at its opposite terminal to energized conductor 290. With the solenoid 258 energized, the valve spool 256, FIG. 4, is moved leftwardly to condition the table for fast indexing movement. Actual indexing movement of the table 24, however, is delayed slightly until the index plunger 67 is withdrawn and the table elevated slightly to facilitate indexing movement.

As hereinbefore described, with the control system conditioned for "home" to 180° movement, the first holding circuit for the relay 374 and the solenoid 258 extends through the contact bar of binary switch 189, conductor 367, and the lower closed contact bar of energized binary relay 363. At the start of any index cycle, it will be recalled that both of the creep-stop switches 190 and 191 are coincidently retained in open position by one or another of the cams 184, 184A, 184B, and 184C, FIG. 4.

As soon as the table moves 9° from an index station, switches 190 and 191 are both moved to closed position, thus establishing a second parallel holding circuit for the relay 374 and solenoid 258.

Prior to this, however, movement of the control relay 374 to upwardly closed position effects completion of another circuit for energizing the index table unpin solenoid 239 and, sequentially, a second circuit to energize table unclamping solenoid 229. The table unpin circuit is completed from energized conductor 303, a conductor 383, the upwardly closed contact bar 384 of control relay 374 to a conductor 385. This circuit continues from conductor 385, through closed contact bar 387 of pallet clamp interlocking relay 321 to a conductor 388. The circuit is then completed from conductor 388 through the solenoid 239 to the energized conductor 290. Energization of solenoid 239 in turn actuates the index plunger valve 234 to retract plunger 67 from engagement with the table notch ring 58. Retraction of plunger cam 78 permits deactuation of switch 79 to a closed position in bridging engagement between conductors 390 and 391, FIGS. 4 and 5. A circuit is then completed from energized conductor 303, the normally closed contact bar 392, conductor 390, switch 79, conductor 391 through solenoid 229 to energized conductor 290.

Whenever fluid pressure through hydraulic line 96 has operated to unclamp the table 24 and elevate it slightly to facilitate indexing, a pressure actuated switch 394, FIGS. 4 and 5, interconnected in hydraulic line 96 is moved to closed position. Closure of pressure switch 394 completes a circuit for energizing solenoid 252 to start table indexing at a rapid rate, since solenoid 258 is already retained in energized position. The control circuit for energizing solenoid 252 is completed from energized conductor 385, closed contact bar 387, conductor 388, to a conductor 395. The energized control circuit continues from conductor 395 through the contact bar of normally open interlocking switch 80, the switch 80 having been actuated to upward closed position by outward movement of index plunger 67. The flow of current continues through the closed contact bar of pressure actuated switch 394, a conductor 396, and normally closed contact bar 397 to the conductor 348. With the index reverse switch 347 positioned for clockwise indexing, as shown in FIG. 5, the circuit continues from conductor 348, through the closed switch 347, via a conductor 398 to energize the solenoid 252 connected at its opposite terminal to conductor 290. Energization of solenoid 252 in turn effects immediate rotation of the worktable in a clockwise direction from its 0° or "home" position to its 180° position. The described circuit conditions for initiating indexing movement of the worktable 24 to any selected index position occur almost simultaneously upon momentary closure of cycle start switch 328.

With the table connected to be rotated from "home" to 180° position, it will be apparent that the cam mechanism 172, FIG. 4, will actuate binary switch 188 and creep-stop switches 190, 191 to open position as the respective cam lobes and the table 24 rotate through their 90° positions. Since the selector knob 323, FIG. 6, has been positioned for 180°, cam actuated opening of binary switch 188 and switches 190, 191 has no effect on continuous table movement at the 90° position. As the table approaches nonselected 90° position in a clockwise direction, the cam lobe 182 will actuate switch 188 to open position. Shortly thereafter, the cam lobe 184A will actuate the series interconnected creep-stop switches 190 and 191. Referring now to FIG. 5, it will be apparent that movement of switch 188 upwardly in response to cam lobe 182 will move contact bar thereof into bridging engagement between conductors 343 and 344. Even though contact bar 188 is retained upwardly for 30°, this has no effect on passing the 90° position as the holding circuit to coil 374 and solenoid 258 is already completed through the downwardly positioned contact bar of binary switch 189. The holding circuit through the contact bar of switch 188 retains the relay 374 and solenoid 258 energized, as the cam lobe 184A moves switches 190 and 191 to their open position.

As the table 24 approaches its selected 180° position, however, cam lobe 183 actuates binary switch 189 upwardly into bridging engagement between conductor 399 and the conductor 368. With the contact bar of switch 189 in engagement between conductors 399 and 368, coincidence is established with the downwardly engaged selector switch 326, as indicated by the chart in FIG. 7. Since the relay 363 is retained in upward energized position, the holding circuit from conductor 368 is interrupted both by upward movement of switch 189 and the open contact bar 401 of relay 363. During the interval between cam actuation of binary switch 189 and the slightly later cam actuation of switch 191, an overlapping parallel holding circuit is maintained to retain relay 374 and solenoid 258 energized. This circuit is completed from conductor 377, closed contact bar of relay 374, conductor 381, and the respective contact bars of switches 191 and 190 to a conductor 402 connected to energized conductor 303. Approximately 9° from the selected 180° position, the cam lobe 184B actuates switch 190 to open position, to interrupt the holding circuit through switch 191 to conductor 381, thus permitting de-energization of relay 374 and solenoid 258. De-energization of solenoid 258 immediately reduces fast table movement of a creep rate. Even though control relay 374 is de-energized, a holding circuit is maintained from energized conductor 303 to the conductor 385 for maintaining the solenoid 239 energized during the remaining 9° of table movement at creep rate.

Immediately prior to movement of contact bar 384 to normally open position, an overlapping contact bar 404 of the relay 374 is moved into normally closed bridging engagement between a conductor 405 and conductor 385 to maintain clockwise motor solenoid 252 energized. The holding circuit now continues from conductor 385, closed contact bar 404, conductor 405, the closed contact bar of switch 191 to the conductor 381. This holding circuit is completed from conductor 381 through a normally closed overlapping contact bar of relay 374 to a conductor 407 connected to control conductor 303. Upon arrival of the table 24 in its approximate 180° position, the cam lobe 184B has travelled a sufficient distance to actuate switch 191 to open position to interrupt the holding circuit from conductor 405 to conductor 381. Since the switch 190 is already in open position, opening of switch 191 immediately effects de-energization of the clockwise table solenoid 252 to stop table movement. At the same time, with the holding circuit interrupted to conductor 385, the index plunger solenoid 239 is likewise de-energized to effect final precise positioning of the worktable in its 180° position.

After the table has been finally positioned by radial inward movement of the index plunger, the switch 79 returns to the actuated position. Actuation of the switch 79 interrupts the holding circuit to the conductor 391 to de-energize table unclamp solenoid 229, thereby returning the table to its fully clamped position.

It will now be assumed that clockwise indexing movement is continued from 180° position to the 0° or "home" position. To accomplish this, the selector knob 323 is rotated to the position in FIG. 6, in which both switches 325 and 326 are in open position. Momentary movement of the index cycle start switch 328, FIG. 5, is then operative to initiate table movement from the 180° position, by-passing the nonselected 270° position, and stopping at the 0° position. At the start of this indexing cycle, binary switch 189 is maintained in upward engagement bridging conductors 399 and 368 by means of cam lobe 183. Therefore the 180° to 0° starting circuit is now completed from control conductor 303, a conductor 409, normally closed contact bar 401, conductor 399, upwardly closed switch 189 to the conductor 386. From the conductor 368 the starting circuit continues via conductor 369, momentarily closed switch 328 to the conductor 370, thus effecting energization of relay 374 and solenoid 258. Since both creep-stop switches 190, 191 are in open position, the holding circuit for the relay 374 and solenoid 258 is established through the upwardly closed contact bar of binary switch 189. Sequential unpinning and unclamping of the table is effected as hereinbefore described. Likewise 9° movement of the table and cam mechanism from 180° effects closure of switches 190 and 191 to effect a parallel overlapping circuit from energized conductor 402 to the conductor 381 and the conductor 377. The overlapping holding circuit through series connected switches 190 and 191 is effective to retain the relay 374 and solenoid 258 energized as the table passes the 15° position and binary switch 189 is opened to interrupt the originally established holding circuit to conductor 399. As the table approaches its 270° position, both binary switches 188 and 189 are moved upwardly in response to cam lobes 182A and 183A respectively. Thus, an overlapping parallel holding circuit is re-established from the control conductor 303 through upwardly closed switches 188 and 189 to conductors 369 and 368. As hereinbefore explained, the parallel holding circuit is maintained for approximately 30° of table rotation during which the series holding circuit through switches 190, 191 is interrupted for approximately 18°, or within the range of binary switch operation. The series holding circuit through switches 190, 191 is re-established prior to the switches 188 and 189 again moving to open position.

With both binary switches 188 and 189 in open position, as shown in FIG. 5, coincidence is immediately established with the open selector switches 325 and 326. The control circuit is thus conditioned for stopping table movement upon its return to "home" position. Since neither of the binary switches 188 and 189 is cam actuated in "home" position, the table continues to rotate at a rapid rate until switch 190 is actuated to open position by cam lobe 184 to de-energize relay 374 and solenoid 258. Table movement continues at creep rate until switch 191 is actuated to open position by cam lobe 184 to stop clockwise table movement in its approximate "home" position. Movement of the index plunger to effect final positioning of the table and de-energization of the solenoid 229 is again effected as hereinbefore described to securely clamp the table 24 in its "home" position.

It should be noted that a parallel anti-coincident holding circuit is always established through one or the other, or both of the binary switches 188 and 189 whenever the worktable is passing a nonselected index station. During this 30° interval, it should also be noted that the holding circuit through series interconnected creep-stop switches 190, 191 is interrupted for approximately 18° of table and cam mechanism movement. The switches 190 and 191 are again moved to closed position to re-establish the series connecting holding circuit in overlapping relationship and prior to the interruption of the anti-coincidence holding circuit upon movement of switches 188, 189 to downward open position. This circuit relationship exists irrespective of whether the worktable is indexed in a clockwise or counterclockwise direction. Likewise, final interruption of the holding circuit to de-energize relay 374 and solenoid 258 for initiating creep rate is effected when either switch 190 or switch 191 is moved to open position. When the table is rotating in a clockwise direction, as hereinbefore explained, switch 190 is opened to initiate creep movement and switch 191 is coincidently opened therewith to stop table movement. Conversely, when the table is being indexed in a counterclockwise direction, switch 191 is opened to initiate creep movement and switch 190 is coincidently opened to stop table movement in the selected index position.

Whenever selector switch 325 is moved to closed position in manual mode, a circuit is completed to energize a binary relay 414 to upwardly closed position i.e. if the table is to be moved to either a 90° or a 270° position. The lower contact bars of relay 414 are interconnected between the energized control conductor 303 and binary switch 188 in a manner similar to the interconnection of binary relay 363 relative to switch 189. Inasmuch as the effect of binary relay 414 is the same as relay 363, it is not deemed necessary to fully describe each of the anti-coincidence and coincidence circuits. Actually these relays coact with the associated binary switches 188 and 189 to either establish an anti-coincidence holding circuit for by-passing a non-selected index position, or effecting an interrupted coincident circuit whenever the table 24 and cam mechanism 172 approaches within 15° of the selected index position.

At the completion of each index cycle, index plunger actuated switch 79 is positioned in bridging engagement between energized conductors 417 and 418. This circuit continues from conductor 418, through the normally closed contact bar of relay 374, conductor 419, and closed pressure actuated switch 420 to a conductor 421. From the conductor 421, the circuit continues through the coil of an interlocking relay 422, and thence through the coil of an index complete relay 423 to control conductor 290. The relay 422 is provided with a contact bar interconnected in the automatic, or digital control system. In manual mode, energization of index complete relay 423 permits energization of the pallet unpinned solenoid 210 and pallet unclamped solenoid 220 whenever the table is returned to its 0° position. Upon return movement of the table to its home position, a start switch 425 may be depressed to establish a holding circuit for energizing the relay 308 and sequentially effecting energization of solenoids 220 and 210 for unclamping and unpinning the pallet prior to transferring it to the next station.

For operating the index table automatically, the mode control switch 306 is moved to closed position thus completing a circuit from conductor 303 through the coils of relays 313, 372, and 426 to energized control conductor 290. Energization of relays 313, 372 and 426 to upwardly closed position conditions the control circuit for operation in automatic mode, and precludes manual control of indexing movement. With this condition existing, manual mode position selector switches 325 and 326 are disconnected from the circuit. At the same time digital control binary selector relays 325A and 326A are interconnected in the circuit by means of closed contact bars 427 and 428 associated with relay 313. The coils respectively associated with selector relays 325A and 326A are directly connected to be selectively energized by means of a digital control system 430. The digital control system 430 may be of any well known type, utilizing either punch tape or magnetic type tape for example, in a manner to program machine functions in any predetermined sequence.

Energization of relay 372 effects upward movement of a normally closed contact bar to interrupt and disconnect the manual cycle start switch 328 from operative relationship between conductors 344 and 370. The index cycle is initiated whenever a start relay 441 is energized to closed position to complete a start circuit from conductor 369, a conductor 442, the closed contact bar of relay 372 to conductor 373. The coil of relay 441 is connected via conductors 443 and 444 to be energized by the digital control system. Thus, whenever anti-coincidence exists between selector relays 325A, 326A and cam actuated binary switches 188 and 189, energization of relay 441 initiates an index cycle.

Energization of relay 426 to upward closed position in turn disconnects the manually operative direction controlling switch 347, and interconnects a selectively energizable digital controlled reverse relay 431 for controlling the direction of indexing movement. Upward movement of contact bar 397 interrupts the circuit from conductor 396 to the conductor 348 to disconnect the manual reverse switch 347. At the same time, closure of contact bar 432 establishes a shunt circuit from conductor 396, via contact bar 432 to a conductor 433. With relay 431 in de-energized condition during automatic mode, a circuit is conditioned for subsequent energization of the counterclockwise table solenoid 251. Energization of the relay 431 completes a circuit from conductor 433 to conductor 398, thus conditioning the circuit for subsequent energization of the clockwise table motor solenoid 252. The coil for actuating reverse relay 431 is connected to be energized via conductors 435, 436 directly by programmed information from the digital control system 430.

At the completion of any index cycle, during automatic mode, the relay 422 is connected to be energized upon actuation of switch 79 into bridging engagement between conductors 417 and 418. Energization of relay 422 completes a circuit from a conductor 438 to a conductor 439 connected at their opposite ends to supply input signal information to the digital control system 430. Input signal effected by energization of relay 422 at completion of an index cycle, together with the energized condition of binary relays 325A and 326A at the start of the cycle, cooperate to supply information to the digital control system for indicating the actual table position. The digital control system thus is conditioned to effect selective energization of binary relays 325A, 326A and reverse relay 431 to initiate a subsequent indexing movement in accordance with any desired preset program.

While the invention has been shown and described as applied to an indexable work support for a machine tool, it is to be understood that it may be incorporated with equal advantage in other indexable members for a machine. It is likewise possible to perform indexing movements throughout 360° or for repetitive indexing operations in continuous 360° cycles of operation. Although particular structures have been shown and described in considerable detail as exemplifying the manner in which the various embodiments of the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, we hereby claim as our invention:

1. In an index mechanism for a machine tool, a frame, a support rotatably carried by said frame for selective indexable movement to a plurality of different index stations, a selectively energizable reversible motor connected to rotate said support to a selected index position, a motor controller connected to control the operation of said motor at a fast speed, a slow speed and to stop said motor, a cam mechanism journalled in said frame to be rotated by said support, a plurality of peripherally spaced cam lobes carried by said cam mechanism and corresponding in number to the number of index stations for said support, a pair of switches carried by said frame presenting actuating plungers adapted to be coincidentally actuated by one of said cam lobes whenever said support is positioned in an index station corresponding to that particular cam lobe, either one of said switches being actuatable in advance of the other, depending upon the direction of indexing movement, for operating said motor controller to initiate slow speed indexing movement of said motor, and a presettable index control system including a source of electrical energy and a reversing switch operatively connectable to operate said motor controller to initiate rapid indexing movement of said support to a predetermined position relative to any predetermined index position, said motor controller being responsive to whichever of said switches is initially actuated by the one of said cam lobes which corresponds to the selected index position of said support and being operable to reduce the speed of said motor to slow speed, said cam lobe which corresponds to the selected index position of said support and being operative to actuate the other one of said switches while retaining the first switch actuated upon arrival of said support in its selected index position to operate said motor controller to stop motor operation.

2. In a machine tool, a frame, a member carried by said frame for selective positioning advancement to one of a plurality of different index stations in any predetermined sequence, said member presenting a plurality of index notches corresponding in number to the number of available index stations, a retractable index plunger movably carried by said frame in a manner to be normally engaged with one or another of the index notches presented by said member in a manner to effect final positioning movement thereof, a plurality of position determining switches responsive to movement of said member to its next selected position, said position switches being actuatable in different binary code combinations corresponding to the total number of available index stations, cam control means connected to be driven by said member and operative to actuate said position determining switches in a binary code combination corresponding to that particular indexed position, a plurality of selector switches predeterminately positionable in any binary code combination corresponding to the next selected indexed position of said member, a control circuit including a source of electrical energy and an index cycle start switch interconnected between said position switches and said selector switches, said index cycle start switch being operable to initiate an index cycle, plunger retracting means connected to be actuated upon operation of said index cycle start switch for retracting said plunger as a prerequisite to starting indexing movement, and member moving means responsive to said control circuit upon operation of said cycle start switch including a motor connected to move said member until coincidence of operation is established between said position switches and said selector switches, said control circuit being operative in response to the establishment of coincidence between said selector switches and said position switches to sequentially deactivate said member moving means and release said plunger retracting means in a manner that said plunger is urged into engagement with the index notch presented by said member that corresponds with the selected index station.

3. In a machine tool, a work support arranged to be movable to a preselected position, power driven means for moving said support, first and second control circuit means connected in parallel to control said power driven means, said first control circuit means connected to be interrupted upon arrival of said support at a position in proximity to the preselected position, a pair of creep-stop switches operative after interruption of said first control circuit means to effect a reduction of the rate of movement of said power driven means and subsequently to deactivate said power driven means for stopping movement of said support in its preselected position, and cam means connected to be moved by said support, said cam means being operative to actuate one of said creep-stop switches to effect a reduction in the operation of said power driven means from fast to creep rate, said cam means being sequentially operative to actuate said second creep-stop switch while retaining said first switch actuated to interrupt said second control circuit means, whereby coincident actuation of said creep-stop switches operates to deactivate said power driven moving means for stopping movement of said support in its preselected position.

4. In a machine tool, a support member carried for selective positioning movement, power driven means connected to move said member to a selected one of a plurality of spaced apart positions, presettable control circuit means connected to energize said power driven means for moving said member to a position in proximity to a preselected one of said positions, a creep-stop control circuit connected in parallel with said control circuit means to maintain an energized circuit to said power driven means, a pair of creep-stop switches connected in series in said creep-stop control circuit, and a plurality of cams spaced apart to correspond to the available spaced apart positions of said member and being connected to be driven by said support, one or another of said cams connected to actuate one of said switches after interruption of said control circuit means for reducing the rate of support movement, said actuating cam being operative to subsequently actuate the other of said switches coincidentally with said first switch to interrupt said creep-stop circuit for de-energizing said power driven means to stop movement of said support, and power driven mechanical means connected to effect final positioning movement of said member to preselected position.

5. In a machine tool, a central supporting hub, an axially movable centering rod extending through said hub, a table journalled to rotate about said hub for movement from a starting position to a selected one of a plurality of index stations, a clamp element movably carried by said table, a work carrying pallet presenting a positioning aperture and being removably positionable upon said table in a manner .hat the aperture presented thereby is in approximate alignment with said rod, first power operable means connected to urge said pilot rod upwardly for moving said pallet laterally into predetermined aligned relationship to said table, second power operable means connected to actuate said clamp element for urging said pallet into clamping engagement with said table, power driven means connected to move said table and said pallet to a selected one of a plurality of index stations, first and second control circuit means connected in parallel to control said power driven means, said first control circuit means connected to be interrupted upon arrival of said support at a position in proximity to a preselected position, a pair of creep-stop switches operative after interruption of said first control circuit means to effect a reduction of indexing movement to creep rate and subsequently to deactivate said power driven means for stopping movement of said table in a preselected position, cam means connected to be moved by said table, said cam means being operative to actuate one of said switches to effect a reduction of indexing movement to a slow rate, said cam means being sequentially operative to actuate said second switch while retaining said first switch actuated to interrupt said second control circuit means in such a manner that coincident actuation of said creep-stop switches operates to stop table movement in a preselected position, means for actuating said first and second control circuit means for returning said table to its starting position, and means responsive to arrival of said table in its starting position connected to effect sequential operation of said second and said first power operable means for respectively unclamping said pallet and retracting said centering rod from engagement therewith.

6. In a machine tool, a support arranged to be movable to a preselected position, power driven means connected to move said support, control means including a source of energy connected to control the duration of energization of said power driven means for moving said support to a preselected position, said control means comprising a presettable index control circuit and a creep-stop control circuit connected in parallel with said index control circuit, said creep stop control circuit being operable to retain said power driven means energized after said index control circuit has been interrupted, means for automatically interrupting said presettable index control circuit after movement of said support to a position in proximity to a selected index position to thereby condition said power driven means for subsequent stopping, a pair of creep-stop control switches interconnected in said creep-stop control circuit and being positioned for sequential operation irrespective of the direction of support movement, a cam connected to be driven by said support and being operative after said presettable control means is interrupted to actuate one of said creep-stop switches for changing the rate of support movement, said cam being operative to effect subsequent actuation of the other of said creep-stop switches while retaining said first switch actuated, said creep-stop switches being operative upon coincident actuation by said cam to interrupt said creep-stop control circuit to de-energize said power driven means for stopping movement of said support in a preselected position.

7. In a machine tool, a support member carried for selective positioning movement, power driven means connected to move said member to a selected one of a plurality of spaced apart positions, presettable control circuit means connected to energize said power driven means for moving said member to a position in proximity to a preselected one of said positions, a creep-stop control circuit connected in parallel with said presettable circuit means to maintain an energized circuit to said power driven means after said control circuit has been interrupted, a pair of creep-stop switches connected in series in said creep-stop control circuit, and a plurality of cams spaced apart to correspond to the available spaced apart positions of said member and being connected to be driven by said support, one or another of said cams connected to actuate one of said switches after interruption of said control circuit means for reducing the rate of support movement, said actuating cam being operative to subsequently actuate the other of said switches coincidentally with said first switch to interrupt said creep-stop circuit for de-energizing said power driven means to stop movement of said support in preselected position.

8. In a work supporting mechanism for a machine tool, a central supporting hub, an axially movable centering rod extending through said hub, a table journalled to rotate about said hub, a clamp element movably carried by said table, a work carrying pallet presenting a positioning aperture and being removably positionable upon said table in a manner that the aperture presented thereby is in approximate alignment with said rod, power operable means connected to urge said pilot rod upwardly for moving said pallet laterally into predetermined aligned relationship to said table, separate power operable means connected to actuate said clamp element for urging said pallet into clamping engagement with said table, power driven means connected to advance said table to a selected one of a plurality of index stations, and an index control system connected to selectively energize said power driven means for advancing said table and said pallet to a selected index station.

9. In a reversible positioning control system for a machine tool, a frame, an electrical control circuit, an indexable member movable to one of a plurality of index stations relative to said frame under the control of said control circuit, a plurality of cam lobes connected to be moved by said member, a pair of creep-stop switches connected in said control circuit and carried by said frame as to be sequentially operated by one or another of said cam lobes irrespective of the direction of movement of said member, one of said switches being operative to reduce the rate of movement from rapid to creep rate, the other of said switches being operated coincidentally with said first operated switch for stopping movement of said member in the selected index position, said electrical control circuit including a presettable index controller including member moving means automatically connected to move said member to a position of proximity to a preselected index station, and control transfer means in said circuit operative upon arrival of said member in proximity to selected position adapted to transfer control of said member moving means to said creep-stop switches whereby said creep-stop switches operate to effect a reduction in the rate of travel of said member and final stopping thereof in any preselected index station.

10. In a machine tool, a support arranged to be movable to a preselected position, power driven means connected to move said support, presettable index control circuit means including a cycle start control and a source of energy operative to activate said power driven means for moving said support to a selected position, an auxiliary control circuit operatively connectable in parallel from said source of energy to said power driven means upon actuation of said cycle start switch to retain said power driven means energized after said index control circuit has been interrupted, a pair of creep-stop switches operatively interconnected in said auxiliary control circuit, position cam means driven by said support connected to interrupt said index circuit control means upon approach of said support to a position in proximity to its preselected index position, creep-stop cam means driven by said support operative to effect sequential operation of said creep-stop switches, said creep-stop cam means being operative to first actuate one of said creep-stop switches for effecting a reduction in the rate of movement of said support from rapid to creep rate after said index control circuit means is interrupted, said creep-stop cam being operative to subsequently actuate the second of said creep-stop switches while retaining said other switch actuated to interrupt the parallel circuit to said power driven means for stopping movement of said support at a preselected position, whereby coincident actuation of said creep-stop switches operates to effect stopping of said support.

11. In an index mechanism for a machine tool, a frame, a support rotatably carried by said frame for selective indexable movement to a plurality of different index positions, a selectively operable reversible fluid motor connected to rotate said support to a selected index position, a source of fluid pressure connected to supply fluid pressure to said motor, fluid control means connected to control the supply of fluid pressure to said motor for controlling the direction of motor operation and the rate of motor operation at a rapid speed or a slow speed and to stop motor operation, a cam mechanism journalled in said frame and connected to be rotated by said support, a plurality of peripherally spaced cam lobes carried by said cam mechanism corresponding in number to the number of index positions for said support, a pair of switches carried by said frame presenting actuating plungers adapted to be simultaneously actuated by one of said cam lobes whenever said support is positioned in an index position corresponding to that particular cam lobe, either one of said switches being actuated in advance of the other, depending upon the direction of indexing movement, to actuate said fluid control means to initiate slow speed operation of said motor for slow speed indexing movement of said support, and a presettable index control system including a source of electrical energy and a reversing switch operatively connectable to actuate said fluid control means to initiate operation of said motor for rapid indexing movement of said support to a predetermined position relative to any predetermined index position, said fluid control means controlling the slow speed operation of said motor in response to whichever of said switches is initially actuated by said cam lobe corresponding to the selected index position of said support, said cam lobe corresponding to the selected index position of said support being operative to simultaneously actuate both of said switches to actuate said fluid control means for stopping the operation of said motor upon arrival of said support in the selected index position.

12. In a machine tool, a work support arranged to be movable to a preselected position, a source of fluid pressure, a fluid motor energizable from said source of fluid pressure for moving said support, fluid control means connected to selectively control the operation of said fluid motor at a rapid speed or a slow speed and to stop the operation of said motor, first and second control circuit means connected in parallel to control the operation of said fluid control means, said first control circuit means being connected to be interrupted upon arrival of said support at a position in proximity to the preselected position, a pair of creep-stop switches operative after interruption of said first control circuit means to actuate said fluid control means, and cam means connected to be moved by said support, said cam means being operative to actuate one of said creep-stop switches to actuate said fluid control means to effect a reduction of motor operation from fast to creep rate, said cam means being sequentially operative to actuate said second creep-stop switch while retaining said first creep-stop switch actuated to interrupt said second control circuit means to actuate said fluid control means for stopping motor operation and thereby said support in the preselected position.

References Cited in the file of this patent
UNITED STATES PATENTS

| | | |
|---|---|---|
| 2,366,398 | Harrington | Jan. 2, 1945 |
| 2,380,873 | Schafer et al. | July 31, 1945 |
| 2,476,673 | May et al. | July 19, 1949 |
| 2,669,006 | Soule et al. | Feb. 16, 1954 |
| 2,685,122 | Berthiez | Aug. 3, 1954 |
| 2,686,894 | Mathieu | Aug. 17, 1954 |
| 2,808,557 | Smith | Oct. 1, 1957 |
| 2,814,013 | Schweighofer | Nov. 19, 1957 |
| 2,834,166 | Fogwell et al. | May 13, 1958 |